United States Patent Office 3,300,133
Patented Jan. 24, 1967

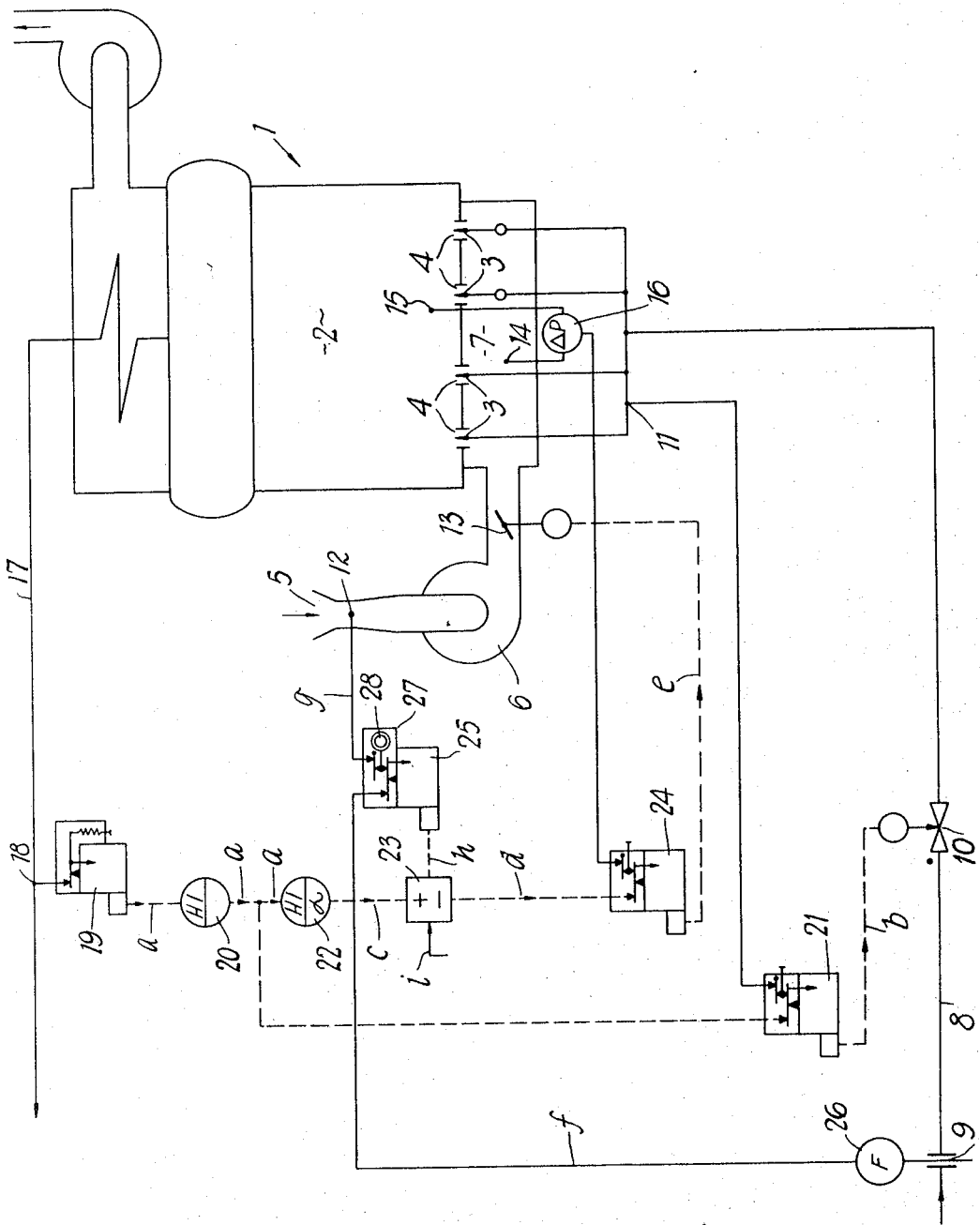

3,300,133
CONTROL OF STEAM GENERATORS
Charles Edward Dines, Lewisham, London, England, assignor to Elliott Brothers (London) Limited, a company of Great Britain
Filed Apr. 5, 1965, Ser. No. 445,444
Claims priority, application Great Britain, Apr. 7, 1964, 14,347/64
3 Claims. (Cl. 236—14)

This invention concerns improvements relating to the automatic control of oil-fired steam generators. An object of the invention is to provide for automatic control of combustion over a wide range of operation. In particular, it seeks to provide for close control of the quantities of fuel and air at normal high loadings, at which the high efficiency resulting from a low excess of air, or the maintenance of conditions approximating to the stoichiometric fuel/air mixture, is important, while safe operation, that is the certainty of sufficient air, is ensured at low and very low loadings such as occur during starting up and the hazards of incomplete combustion are avoided.

The accuracy of control of the fuel/air ratio depends upon the accuracy with which the oil flow and the air flow can be measured. Differential-pressure measurements taken across a venturi or orifice constriction provided in the common oil-supply pipe and the common air-supply duct can be used for determining the total oil and air flows respectively. When a wide range of fluid velocity has to be measured, however, the uncertainty of measurement or possible error will represent a larger proportion of the measurement at low velocities than at high velocities. For instance, an uncertainty of ±½% of the reading at 100% of the range represents ±1% at 50% of the wide range and ±5% at 10% of the range. Consequently a wide range of measurements cannot be made if the permissible uncertainty is not to exceed ±1% of the reading.

An alternative method of determining the quantities of fuel and air for control purposes involves measurement of the oil and air pressures at the oil burners and associated air-supply ports respectively, the burners being of the type in which the oil flow is substantially proportional to the square root of the pressure supplied to the burner, while the air flow is substantially proportional to the square root of the difference in pressure between the air-supply box and the combustion chamber. Thus, by controlling the said oil pressure and air-pressure difference in proportion with each other, a fuel/air ratio can be established whose accuracy depends upon the characteristics of the burners and air ports when used for measurement purposes in this fashion. Since the useful range of operation, or so-called turn-down, of a given burner is limited, it is usual to provide a number of burners when it is desired to operate over a range greater than the turn-down range of a single burner. Then, by cutting out burners as the loading is reduced, it is possible to work down to the minimum through-put of a single burner. Although the accuracy of control of the fuel/air ratio obtainable in this manner can be made adequate for safe operation, it is inferior to that obtainable by means of additional measurement devices, independent of the said burners and air ports, as described above and when operated over a limited range.

According to the present invention, apparatus for the automatic control of an oil-fired steam generator comprises means for determining the oil flow and the air flow by differential-pressure measuring devices in the oil-supply and air-supply passages respectively, means for determining the said oil and air flows by oil-pressure and air-pressure measurements at the burners and associated air ports respectively, the ratio of the oil and air flows being arranged to be automatically controlled in dependence upon the said devices over a limited range of high loading and directly in dependence upon the said measurements below the said range of loading. The system of control thus possesses two modes of control, a high-load mode and a low-load mode, by which the requirements for efficient and safe operation of a steam generator can be achieved in a simple and convenient manner over a wide range of operation.

One manner of carrying the invention into effect will now be more fully described by way of example and with reference to the accompanying diagram.

A steam generator 1 has a combustion chamber 2 fired by a plurality of oil burners 3 associated with air ports 4 to which combustion air from an inlet 5 is supplied by a forced-draught fan 6 through a windbox 7. The total flow of oil supplied through a common pipe 8 is measured by reference to the differential pressure produced by a constriction at 9 and is controlled by a valve at 10. The oil pressure at the burners 3 is measured at 11. The total flow of air is measured by reference to the differential pressure produced by a constriction at 12 and is controlled by a valve at 13. The differential air pressure across the ports 4, that is, between points 14 and 15, is measured by a device 16, suitably a pneumatic relay of the force-balance type which provides a pneumatic-pressure signal proportional to the said differential pressure. The steam pressure in the steam-delivery main 17 from the boiler 1 is sensed at 18 and communicated to a controller 19. The connection 18 is a steam-pressure impulse connection which may conveniently be taken directly to the measuring system of the controller 19, for example by employing a pressure movement of the bellows type.

The controller 19 is a conventional steam-pressure controller giving proportional plus integral control action to produce a signal $a$ which varies in square-law relationship with the boiler load and modulates the heat release so that the pressure at the point 18 is maintained substantially at the set value.

The signal $a$ produced by deviation of the steam pressure from a predetermined value set in the controller 19 is transmitted through an automatic/hand-control station 20 to an automatic oil-pressure controller 21 for which the signal $a$ constitutes the set value and the oil pressure at 11 the controlled condition. The station 20 affords means of substituting a hand-adjusted signal for an automatic signal as in conventional control practice. The controller 21, which transmits a control signal $b$ to the oil valve 10, has an integral action and controls the oil-flow rate, by means of the valve, in such a manner as to maintain the oil-pressure at 11 substantially in accordance with the set value represented by the signal $a$ from the controller 19. The signal $a$ is also fed to a ratio-adjustment device 22 which furnishes an adjustable output signal $c$ proportional to the signal $a$. In a simple form, the device 22 may comprise and adjustable orifice that sets an exhaust bleed rate which is proportional to the value of the incoming signal $a$, so that the output signal $c$ is a corresponding, proportional, part thereof.

When the control system is operating according to the low-load mode, the signal $c$ passes through a correcting device 23, hereinafter referred to, the outgoing signal $d$ being equal to the signal $c$. The signal $d$ provides the set value for an air-pressure controller 24 whose controlled condition is the differential pressure between 14 and 15. The controller 24, which may be generally similar to the controller 21, transmits a control signal $e$ to the air-control valve 13. Thus, when the system is operating in this fashion, the effective oil and air pressures are controlled in dependence upon steam pressure, the oil/air ratio being preset by the device 22. If required, the fan speed may be controlled as well as or instead of the valve 13.

When the control system is operating according to the high-load mode, a further automatic controller 25, which may also be generally similar to the controller 21, is active. The set point for this controlled is provided by a signal $f$ produced by an oil-flow measuring device 26 in dependence upon the total oil flow measured at 9. The device 26 is suitably a force-balance pneumatic transmitter which produces a pressure signal proportional to the oil-flow differential pressure. The controlled condition for the controller 25 is represented by a signal $g$ dependent upon the total air flow measured at 12. The controller 25 transmits a correctional signal $h$ to the correcting device 23 which is arranged to add to or subtract from the signal $c$ in such a manner as to produce a correctional modification of the signal $d$ which will cause the total air flow to satisfy a ratio of the signals $f$ and $g$ preset in the controller 25. The device 23 is suitably a retransmitting relay which produces an outgoing signal $d$ equal to the incoming signal $c$ when the set-point signal $h$ is at a value chosen to represent zero correction. Positive/negative deviations from the said value are added to or subtracted from the signal $c$ in such a manner as to produce a correctional modification of the signal $d$ which will cause the total air flow to satisfy a ratio of the signals $f$ and $g$ preset in the controller 25. The signal-comparing element 27 of the controller 25 is furnished with adjustment means 28 by which the effective value of the signal $g$ can be changed in relation to the signal $f$, so that the oil/air ratio of the controller 25 can be adjusted. The said means 28 is conveniently a pilot motor which, upon operation from a remote switch, transverses a fulcrum in the element 27 to determine the moment of the measuring force applied by the signal $g$ and, hence, the total oil-flow/total air-flow ratio. A pneumatic or electrical signal $i$ which may be derived in known manner from a measurement of the boiler loading and/or from the number of burners 3 lit is arranged to act upon the device 23 in such a manner as to allow the aforesaid signal modification to be applied during the high-load mode of control and to reduce the correction to zero during the low-load mode.

The low-load mode of control could be achieved by the use of per se known means without employing the above-described, preferred, correctional modification of the signal $d$. In a simple case, the correcting device 23 may be considered to be bypassed by the signal $c$, as for example by diverting valves which are solenoid operated sequentially to suit the desired condition, that is, the boiler loading or number of burners lit. The transfer time would be prolonged, as necessary for smooth transition from one control mode to the other, by known methods, such as capacity and flow-rate adjustment. Such an arrangement would be adequate, as fast correctional action is not called for.

I claim:

1. In combination with an oil-fired steam generator having oil-supply and air supply passages, and a steam-delivery passage, apparatus for the control of the said generator comprising pressure-responsive oil-flow and air-flow measuring devices in said oil-supply and air-supply passages, respectively, to the said generator, said generator having oil burners with associated air-ports, pressure-responsive means for measuring the oil flow and air flow at said burners and said associated air-ports, respectively, means for controlling the oil-flow and the air-flow in said respective supply passages, an automatic oil-pressure controller operatively connected between the said oil-flow measuring means and the said oil-flow controlling means, an automatic air pressure controller operatively connected between the said air-flow measuring means and the said air-flow control means, a third automatic controller connected to said steam-delivery passage of the generator and responsive to the pressure therein and connected to said oil-pressure and air-pressure controllers for supplying a control signal thereto, a flow-ratio setting device and a flow-ratio correcting device connected between said third controller and said air-pressure controller, a signal source, means influenced by boiler load conditions connected to said signal source for rendering the said ratio-connecting device operative for correcting the ratio set by said setting device over a limited range of high-load conditions, and for rendering the said correcting device inoperative below the said range, and a fourth automatic controller connected between the said oil-flow and air-flow measuring devices on the one hand and the ratio-correcting device on the other hand, whereby the ratio of the oil and air flows is influenced automatically, over the said high-load range, from the said oil-flow and air-flow measuring devices through the intermediary of the said fourth controller and ratio-correcting device and, below the said range, from the said oil-flow and air-flow measuring means at the value set by the ratio-setting device without the intervention of the said fourth controller and ratio-correcting device.

2. Apparatus for the automatic control of an oil-fired steam generator having oil-flow and air-flow passages loading thereto comprising, means for measuring the total oil flow and total air flow to said generator in said oil-supply and air-supply passages respectively, said generator having oil burners and air-ports associated therewith, respectively, means for measuring the oil flow and air flow at the burners and associated air-ports respectively, flow-rate control means for the said oil and air-supply passages respectively and operatively connected to the second-named oil and air-flow measuring means respectively, a controller responsive to steam-pressure at the output from the generator, means connecting said controller to said flow-rate control means for supplying a control signal thereto, a flow-ratio setting device in the connection between said controller and one of said control means, a flow-ratio correcting device responsive to boiler-load conditions and disposed in the connection between the said controller and one of the said control means, a further automatic controller connected to the first-named oil-flow and air-flow measuring means and to the said flow-ratio-correcting device for supplying a ratio-correcting signal to the latter, which signal is applied by the correcting device to the aforesaid control signal for modifying the set ratio over a range of high-load conditions, but is reduced to zero for load conditions below that range.

3. Apparatus according to claim 2, wherein the said further automatic controller includes an adjustable signal-comparing element operatively connected to the first-named oil-flow and air-flow measuring means for receiving therefrom signals depending on the total oil flow and air flow respectively.

References Cited by the Examiner

UNITED STATES PATENTS

| | | | |
|---|---|---|---|
| 1,620,240 | 3/1927 | Smoot. | |
| 2,823,740 | 2/1958 | Morck | 158—119 |
| 2,895,056 | 7/1959 | Bristol | 236—14 X |

JAMES W. WESTHAVER, *Primary Examiner.*